Patented Oct. 29, 1940

2,219,442

UNITED STATES PATENT OFFICE 2,219,442

SYNTHETIC TOOL DIE AND THE METHOD OF MANUFACTURE THEREOF

Isidor Chesler, New York, and Karl M. Herstein, Brooklyn, N. Y., assignors to Eagle Pencil Company, New York, N. Y., a corporation of Delaware No Drawing. Application July 1, 1936, Serial No. 88,334

8 Claims. (Cl. 25—156)

Our present invention relates to compositions for a variety of applications characterized by great hardness, as for instance in cutting and finishing tools, especially for glass, crystal, diamonds and other gems, and in a particular embodiment for dies used in the extrusion and drawing of various materials including metal wires, artificial fibre and pencil leads.

It is among the objects of the invention to provide an inexpensive composition of matter of hardness greatly exceeding that of all known synthetic abrasives and capable of scratching some varieties of the diamond itself.

Another object is to provide a composition of the above type and a process for making the same, which, in the course of preparation and execution thereof, admits of machining into any desired shape of tool, which in completed condition is characterized not only by the hardness noted, but also by a texture of the toughness and the wear-resisting character required for extrusion dies of the above type.

The raw ingredients of the composition are a mixture of a silicate with an oxide of one or more of the elements of the fourth group and even series of the periodic system. The preferred ingredients are titanium dioxide, known as rutile with aluminum silicate or clay, both materials in a refined form. Zirconium dioxide or the dioxides of the other elements of the group above identified, viz. hafnium and thorium may be used instead of or admixed with the rutile, if desired. All these oxides are in the form of white powders and lend themselves readily to the treatments hereinafter set forth.

The materials in the finely comminuted condition noted, are thoroughly admixed and converted into a plastic dough, by addition of an appropriate amount of liquid, preferably water, and after compacting the resultant dough, excess water is removed, and the compacted, dried product is then heat treated. For the production of a tool or die, the molded compacted plastic after drying would be machined to the size and shape required, before subjecting it to the final firing or sintering treatment, by which the required hardness and toughness are imparted.

For the production of abrasives, which are characterized by hardness but not by toughness, the composition is subjected not merely to sintering heat, but is fused. Upon cooling, the lava crystallizes. For most applications the crystallized mass is then crushed into crystal fragments of required size.

A specific method for producing a die or tool and a specific method for producing the abrasive will now be set forth.

For both the die or tool and the abrasive, the most easily available raw ingredients are titanium dioxide and plastic clay. Preferably they are used in the proportion of 200 parts by weight of the former to 95 parts by weight of the latter. The plastic clay, preferably a refined clay such as so-called Schippach clay mined in Germany, is mixed with five parts by weight of water to produce a consistency of approximately that of cream. To this clay the titanium dioxide is added in powdered form and thoroughly admixed by use of a powerful stirrer. The mixture is now subjected to a grinding operation preferably in a pebble mill in which the grinding is preferably conducted for about twenty-seven hours, whereupon the ground mix is pumped into a filter press to separate the solids from the water. The filter pressed cakes are now air dried and then crushed into a powder preferably in a paint mill with heavy mullers. Tempering water is then added to the relatively dry powder and mixed therewith to bring the mass to a plastic state suitable for forming or extrusion. Any entrapped air is then removed from the mass, desirably by compacting it by hammering the mass into cylinders. The mass is then formed into the tool of desired size and shape by an appropriate die, preferably operated under hydraulic pressure which die for many applications would be an extrusion die, in particular where the product to be made is itself an extrusion die.

These rods or strips thus extruded are now laid on correspondingly grooved boards and are covered with rubber pads to maintain them in position, whereupon they are passed through a dryer to remove the moisture of plasticity. The material now has the general physical character of a rod of chalk. It is now readily machined by cutting, planing and boring to the dimensions of the extrusion die or other tool to be produced.

The dies or other tools are now ready for the final operation of firing. For this purpose, in one particular embodiment the units are placed in crucibles and subjected to a preheating operation at a temperature in the neighborhood of 450° F. which operation lasts for about two hours. The crucibles with the material therein are then transferred to a furnace in which the temperature is rapidly raised to about 1650° F. and thereafter slowly raised, taking about two hours to reach a temperature of 1960° F. which latter temperature is maintained for about two hours, whereupon the crucibles are removed from the furnace and allowed slowly to cool in a cooling chamber. In this heating operation the material is brought to and maintained at substantially the sintering point without actually fusing.

Unlike most synthetic hard materials which are preformed to the desired shape from grains and must be retained under pressure in an appropriate form or mold during the sintering operation to prevent disintegration, the present composition admits of considerable manufacturing advantage in that the stock need simply be laid in the crucible, and exposed to the heat without enclosures in molds or the application of pressure thereon.

During the sintering operation set forth, the tool or other article suffers some contraction, but this is found to be practically uniform in all directions and is readily compensated for by methods well known in the ceramic art.

Under the treatment just set forth the article is sintered, but not fused. Although we are not certain exactly what chemical or pseudo-chemical action takes place, it appears that the product is of the nature of a vitrified compound in the nature of a highly acidic ceramic composition. The product as above set forth has hardness exceeding by far that of all known synthetic materials, is much harder than glass or sapphire and will scratch some varieties even of diamonds. In addition to this property of hardness, the product appears to be substantially homogeneous and free from cleavage planes and has unusual toughness, rendering it especially suitable for extrusion dies, for which purpose it outlasts by a wide margin all other known forms of hard synthetic materials.

By reason of its tough, vitreous character the sintered product above described, could be used as an abrasive, (as distinguished from its use as a die), only so long as it presents sharp edges and by the time the latter have become dulled its scratching utility will have been greatly impaired.

For abrasive purposes the stock in its soft machinable chalky state, prior to the firing above described, may be placed into molds of desired shape and instead of merely being sintered, it is subjected to a much higher temperature, in the order of 3000° F. or more, to cause the material to fuse, so that upon cooling, it presents a distinct granular, crystalline rather than a vitreous structure. The crystalline rod, disk, plate or block thus produced may be used as such for an abrasive or for instance for a grinding wheel.

In most applications it is sufficient simply to fuse the unfired rods or to fuse the compacted unextruded filter cake and after the mass has crystallized upon cooling, then to crush it into crystals of grains of the desired size. The crystalline or granular product is quite as hard as the sintered product, but considerably less tough, so that it readily fractures to present new and fresh cutting edges in the course of its use as an abrasive. The powder thus produced is highly satisfactory as an abrasive agency, and serves even for lapping genuine diamonds. Or it may be bonded in the usual manner to make abrasive wheels of any desired characteristics, with more marked free cutting ability than the wheels now in common use.

It is understood that the crushed abrasive reduced to particles of desired size, may readily be bonded to paper or fabric backing to produce an abrasive paper or cloth capable of polishing surfaces of such great hardness as to resist such known abrasives as emery or carborundum cloth. But even where the latter is suitable, the abrasive of our invention is to be preferred by reason of its more expeditious action, due to its greater hardness.

As many changes could be made in the above compositions and processes, and many apparently widely different embodiments of this invention could be made without departing from the scope of the claims, it is intended that all matter contained in the above description shall be interpreted as illustrative and not in a limiting sense.

Having thus described our invention, what we claim as new and desire to secure by Letters Patent is:

1. An extruding die suitable for working metals and the like presenting a wearing surface of a sintered combination resulting from the heating substantially to the sintering point of a mixture of an aluminum silicate and an oxide of an element of the fourth group and even series of the periodic system.

2. An extruding die suitable for working metals and the like presenting a wearing surface of a sintered combination resulting from the heating to substantially the sintering point of aluminum silicate and an oxide selected from the group consisting of titanium and zirconium.

3. An extruding die suitable for working metals and the like having a wearing surface comprising a sintered product resulting from heating to substantially the sintering point of approximately two parts by weight of titanium oxide to one part by weight of the aluminum silicate.

4. The process of preparing an extruding die which comprises mixing a silicate and an oxide of a metal of the fourth group and even series of the periodic system in finely comminuted condition, adding water to bring the mass to a plastic state, compacting the product into the desired form, removing excess water therefrom and treating the material in a crucible in the absence of mechanical pressure thereon until it is sintered to a vitrified state.

5. The method of preparing a composition of matter suitable for conversion into an extruding die or into an abrasive, from a mixture of a silicate and a white powdered oxide of a metal of the fourth group and even series of the periodic system, which method comprises adding water to the silicate to produce a creamy fluid, adding the oxide, intimately admixing and comminuting the ingredients, pressing out the water to produce a cake, drying the cake, crushing it to a powder, adding tempering water to render the mass plastic, forcing out entrapped air from the mass and extruding the latter to produce a rod of desired size and drying the rod.

6. The method of preparing an extruding die from a mixture of a silicate and a powdered oxide of a metal of the fourth group and even series of the periodic system, which method comprises adding water to the silicate to produce a creamy fluid, adding the oxide, intimately admixing and comminuting the ingredients, pressing out the water to produce a cake, drying the cake, crushing it to a powder, adding tempering water to render the mass plastic, forcing out entrapped air from the mass and extruding the latter to produce a rod of desired size, drying the rod, machining it to the desired conformation of die, then firing the die in a crucible to render it hard and vitrified.

7. The method of preparing a tough and hard article from a mixture of approximately two parts by weight of titanium dioxide and one part by weight of refined clay which consists in adding water to the silicate to produce a creamy fluid, adding the dioxide, intimately admixing and comminuting the ingredients, pressing out the water to produce a cake, drying the cake, crushing it to a powder, adding tempering water to render the mass plastic, forcing out entrapped air from the mass, mechanically shaping the article, drying and firing it.

8. The combination recited in claim 7 in which the material in firing, is first preheated for about two hours at an average temperature of about 450° F. then subjected to a temperature in the order of 1650° F. and slowly raised to a temperature in the order of 1960° F. and maintained at about said latter temperature for a period in the order of two hours and then cooled.

ISIDOR CHESLER.
KARL M. HERSTEIN.